May 3, 1960     E. J. RINGER     2,935,075
RELIEF VALVE
Filed Nov. 1, 1954
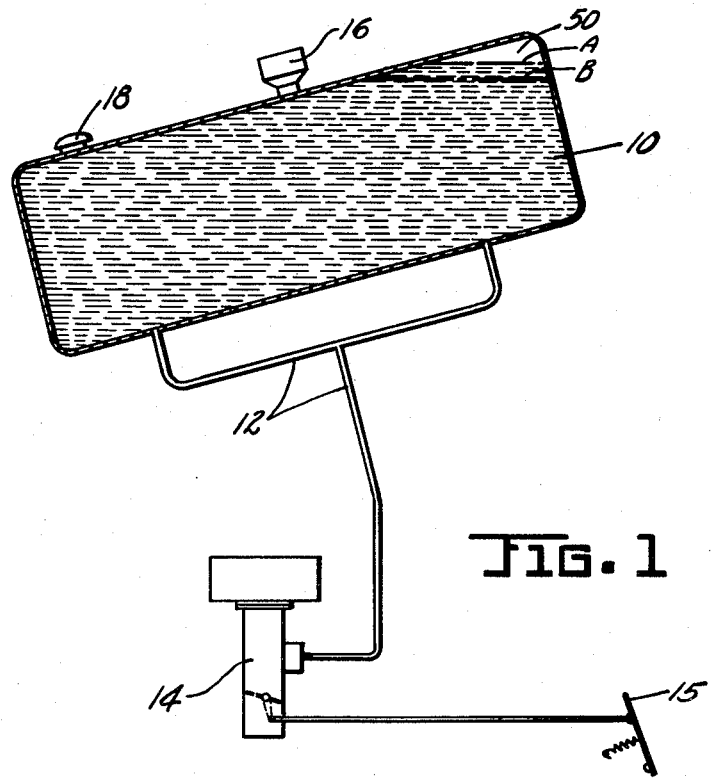
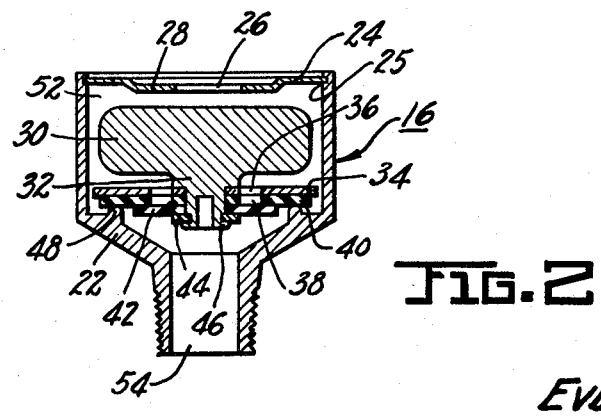
INVENTOR.
EVUE J. RINGER
BY
H. O. Clayton
ATTORNEY

United States Patent Office 2,935,075
Patented May 3, 1960

2,935,075

RELIEF VALVE

Evne J. Ringer, South Bend, Ind., assignor to Bendix Aviation Corporation, South Bend, Ind., a corporation of Delaware Application November 1, 1954, Serial No. 466,039

1 Claim. (Cl. 137—43)

This invention relates in general to check valves and more particularly to a two way check valve adapted, for example, to be mounted on the gasoline tank of self propelled vehicles and serving to facilitate the flow of gasoline or other combustible fluid into the carburetor of said vehicle.

Gasoline tanks of self propelled vehicles, such as a so-called bulldozer, may be mounted on the top of the vehicle and will accordingly be directly exposed to the rays of the sun; and the effect is to unduly heat the gasoline in the tank with a resulting expansion or volatilization thereof. Furthermore this type of vehicle and other types are, during the course of their operation, sharply inclined or declined with respect to the horizontal; and such an attitude of the vehicle often results in an undesired flow of gasoline from the breather opening in the filler cap of the gasoline tank.

It is accordingly an object of my invention to dispense with the conventional gasoline tank filler cap with its air bleed opening and in lieu thereof provide the gasoline tank with an air tight filler cap supplemented by a two way check valve operable both to automatically admit air into the tank when the pressure of the gas within the tank goes below atmospheric pressure and to automatically permit a flow of gasoline or gas out of the tank when a certain critical pressure is reached; that is a pressure to which the top of the tank is subjected and above which there would result an impairment of the operation of the carburetor of the vehicle, it being remembered that the carburetor is fed by the gasoline from the tank. It is also to be noted that the aforementioned sub-atmospheric pressure of the gas above the gasoline in the tank, that is vacuum, would impair the operation of the carburetor.

It is accordingly the principal object of my invention to provide an automotive gasoline tank which will, under all conditions of usage and operation of the vehicle, facilitate an effective and efficient operation of the carburetor of the vehicle.

It is a further object of my invention to provide a container, such for example as a milk can having a filler cap in its top portion, which will effectively house a liquid, said container preventing the flow of liquid therefrom once filled, and preventing the creation of a partial vacuum above the liquid within the container.

Other objects of the invention and desirable details of construction of parts will become apparent from the following detailed description of an illustrative embodiment of the invention, taken in conjunction with the accompanying drawing illustrating said embodiment, in which:

Figure 1 is a view disclosing one example of the gasoline tank of my invention; and Figure 2 is a sectional view disclosing the details of the two way check valve of Figure 1.

There is disclosed in the two figures of the drawing a preferred embodiment of my invention wherein, as disclosed in Figure 1, a gasoline tank 10 is shown in an inclined position such as it would assume if mounted on a self propelled vehicle which was parked or in motion on a relatively steep incline. To the tank 10 there are connected conduits 12 the lower section thereof being connected to the carburetor 14 of the automotive vehicle; and the carburetor is in large measure controlled by an accelerator 15.

Now the usual practice with gasoline tanks of automotive vehicles is to incorporate therein a relatively short fill tube in the top of the tank; and to cover the opening provided by said tube with a cap screw threaded thereto. This cap is usually provided with a relatively small opening to vent the interior of the tank to the atmosphere. Such a construction provides means preventing the creation of a partial vacuum above the gasoline in the tank however the vent opening also permits an undesired flow of gasoline from the tank when the latter is substantially tilted. It is accordingly an object of my invention to provide means supplementing the gasoline tank filler tube and its cap, said means serving to prevent the loss of gasoline from the tank when tilted and to facilitate a normal flow of gasoline to the carburetor of the vehicle.

To the above end there is incorporated in the tank, preferably in the central portion of its top section, a two way check valve and closure unit 16 which is disclosed in detail in Figure 2; and this valve cooperates with a filler tube which may be mounted in one end of said top section. It is important to note that in my invention a detachable cap 18 secured to the tube is of one piece and has no breather opening therein. In other words after the tank 10 has been filled with gasoline or other fuel and the cap screwed into place the only egress or ingress of fuel or gas from or into the tank is via either the conduits 12 or the valve 16.

Referring now to Figure 2 for a detailed disclosure of the unit 16 this accessory includes a casing, preferably a screw machine product, said casing including a cup shaped portion 22. The peripheral edge of said cup shaped portion is preferably closed by a plate 24 staked in place at 25. This plate is provided with a vent opening 26 in its central portion and is preferably provided with a plurality of crimped in portions 28 to insure a free flow of air into the casing past a disk shaped pressure weight 30 described hereafter.

To a two diametered stem 32 of the weight 30 there is secured a metallic disk 34 having a plurality of openings 36 therein said openings registering with openings 38 in a rubberized fabric disk valve member 40 positioned against the support disk 34. Positioned against the valve disk or diaphragm 40 there is provided a rubberized fabric valve member 42, also of disk shape. The members 34, 40 and 42 are secured to the stem 32 by suitable means such as a washer 44 and a fastening member 46. As will be noted by an inspection of Figure 2 the weight 30 and members 34, 40 and 42 may move upwardly as a unit to move the member 40 away from a ring shaped flange portion 48 of the casing 22 said portion constituting a valve seat member; and the peripheral portion of the disk valve member 42 may, with a downward cupping of said member, move away from its contact with the valve member 40.

Describing now the operation of the mechanism constituting my invention the driver of the vehicle will, after completely filling the tank 10, replace the cap 18. We will now assume that the vehicle is driven a sufficient distance to use say a tenth of the gasoline in the tank; and we will further assume that the vehicle is stopped on an incline thereby placing the tank in the position disclosed in Figure 1. We will also assume that the engine of the vehicle is stopped. There will then be a portion of the volume of the tank filled with gas said portion being indicated by the reference numeral 50, Figure 1. This gas, probably a mixture of air and gasoline vapor, will, together with the head of pressure exerted by the gasoline between planes indicated by the letters A and B, Figure 1, exert a pressure upon the valve 40 opposing the pressure of the atmosphere and the pressure exerted by the weight of the weight 30 and members connected thereto; and when the former pressure exceeds the sum of the pressures exerted by the atmosphere and the weight 30 by say a factor of 2 p.s.i. then the valve 40 will be unseated to permit a flow of gasoline into a compartment 52 of the casing. The temperature, humidity, and pressure of the atmosphere, the volatility, coefficient of expansion and density of the gasoline and the gaseous pressure of the gas in the compartment 50 are but some of the factors determining this operation of the valve 40. The weight 30, by its contact with the plate 24 to close the opening 26, serves to prevent a flow of gasoline from the tank when the valve member 40 is unseated.

Continuing our description of the operation of the mechanism, to restart the engine of the vehicle it is of course necessary that there be a proper functioning of the carburetor 14; and the latter cannot function properly if the pressure exerted by the gasoline entering said carburetor exceeds a certain factor. Accordingly the valve 16 and cooperating parts are so constructed and adjusted that the valve 40 will be unseated at or above a certain differential of pressure factor acting thereon, it being remembered that said valve is exposed to the pressure of the atmosphere on its upper side. There is thus provided in the valve 40, means for preventing the gasoline that enters the carburetor from exerting a pressure that would impair the operation of said carburetor.

If the vehicle is on either level or inclined ground then the valve 40 is, in addition to atmosphere pressure, subjected to the pressure exerted by the gas in the tank and within said valve above the level of the gasoline in said tank.

The flow of gasoline into the carburetor is also affected by the sub-atmospheric pressure of the gas above the level of the gasoline in the tank however this is automatically compensated for by the operation of the valve 42. For should such a sub-atmospheric pressure or vacuum be created in the compartment 50 the valve element 42 will immediately open, that is cup downwardly away from the valve 40, thereby permitting a flow of air at atmospheric pressure into the tank via the openings 36 and 38 and a small diametered tubular shaped neck portion 54 of the valve casing.

There is thus provided, by the two way check valve 16, means for insuring the proper flow of gasoline from the tank 10 to the carburetor 14; for the valve 16 controls the pressure exerted by the gasoline at the junction of the conduit 12 and carburetor and such a control automatically controls the flow of gasoline into the carburetor.

If desired the two way check valve 16 of my invention may supplant the cap 18 of the filler tube; and it is also to be noted that the valve 16 may be attached to other liquid containers housing fluids, say a container for any of the well known cleaning fluids.

Although only one embodiment of the invention has been illustrated and described, various changes in the form and relative arrangements of the parts may be made to suit requirements.

I claim:

The combination with a tank adapted to house a volatile fluid, of a filler unit, including an imperforate detachable cap portion, mounted in the top portion of the tank, and a double acting check valve and closure unit also mounted in the top portion of the tank and operable to control both the pressure of the gas above the fluid in the tank and to prevent an efflux of fluid from said tank, said unit including a casing comprising an outwardly facing cup shaped portion, a closure member secured to the periphery of said portion said member having an air vent opening therein, a ring shaped flange member secured to the base of the cup shaped portion, said member serving as a valve seat, a disk shaped valve member provided with a plurality of openings therein and adapted to seat upon the flange member, a relatively flexible disk shaped valve member secured to the aforementioned disk shaped valve member and adapted to cover said openings, and a weight member secured to the two disk shaped valve members and movable therewith as a unit when the first mentioned valve member is moved off of the flange member, said weight member being adapted to close the air vent opening in the closure member to prevent a flow of fluid from the closure unit.

References Cited in the file of this patent

UNITED STATES PATENTS

| | | |
|---|---|---|
| 947,536 | Wenkel | Jan. 25, 1910 |
| 2,016,278 | Ehlers | Oct. 8, 1935 |
| 2,133,575 | Rosenberg | Oct. 18, 1938 |
| 2,314,330 | Eshbaugh et al. | Mar. 23, 1943 |
| 2,587,960 | Bletcher et al. | Mar. 4, 1952 |